April 23, 1963     A. EISELE     3,086,292
SURFACE-SEPARATION MEASURING GAUGE
Filed June 10, 1960     2 Sheets-Sheet 1
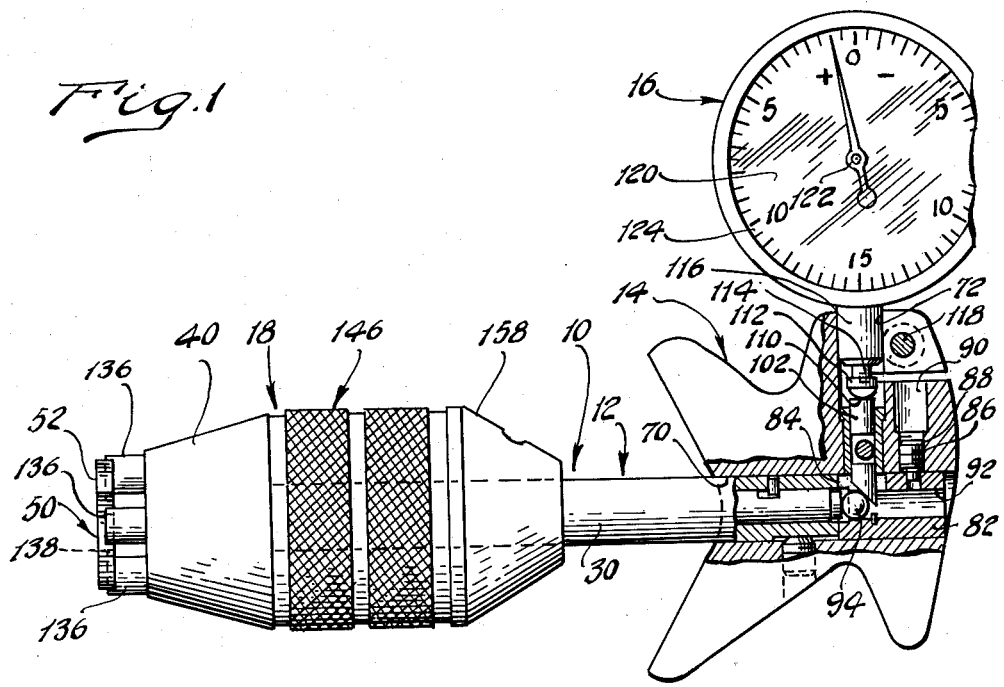
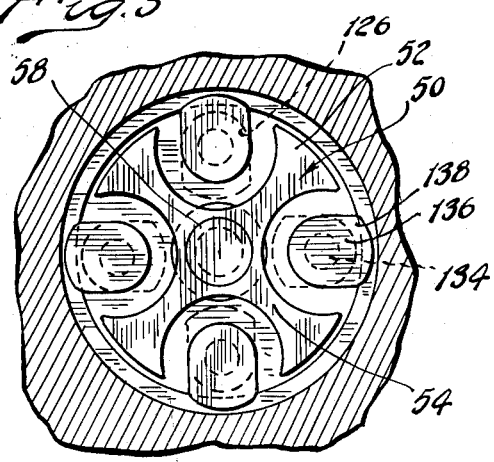
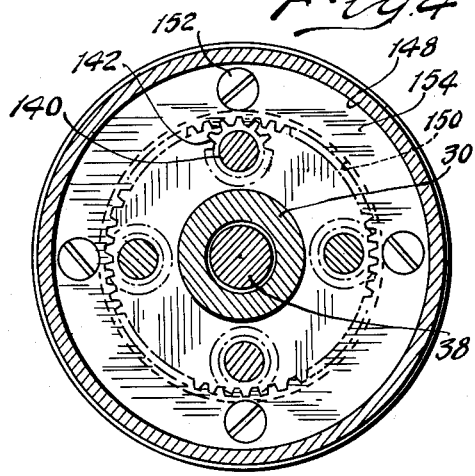
INVENTOR.
ANDREW EISELE
BY
Barthel + Bugbee
ATTORNEYS.

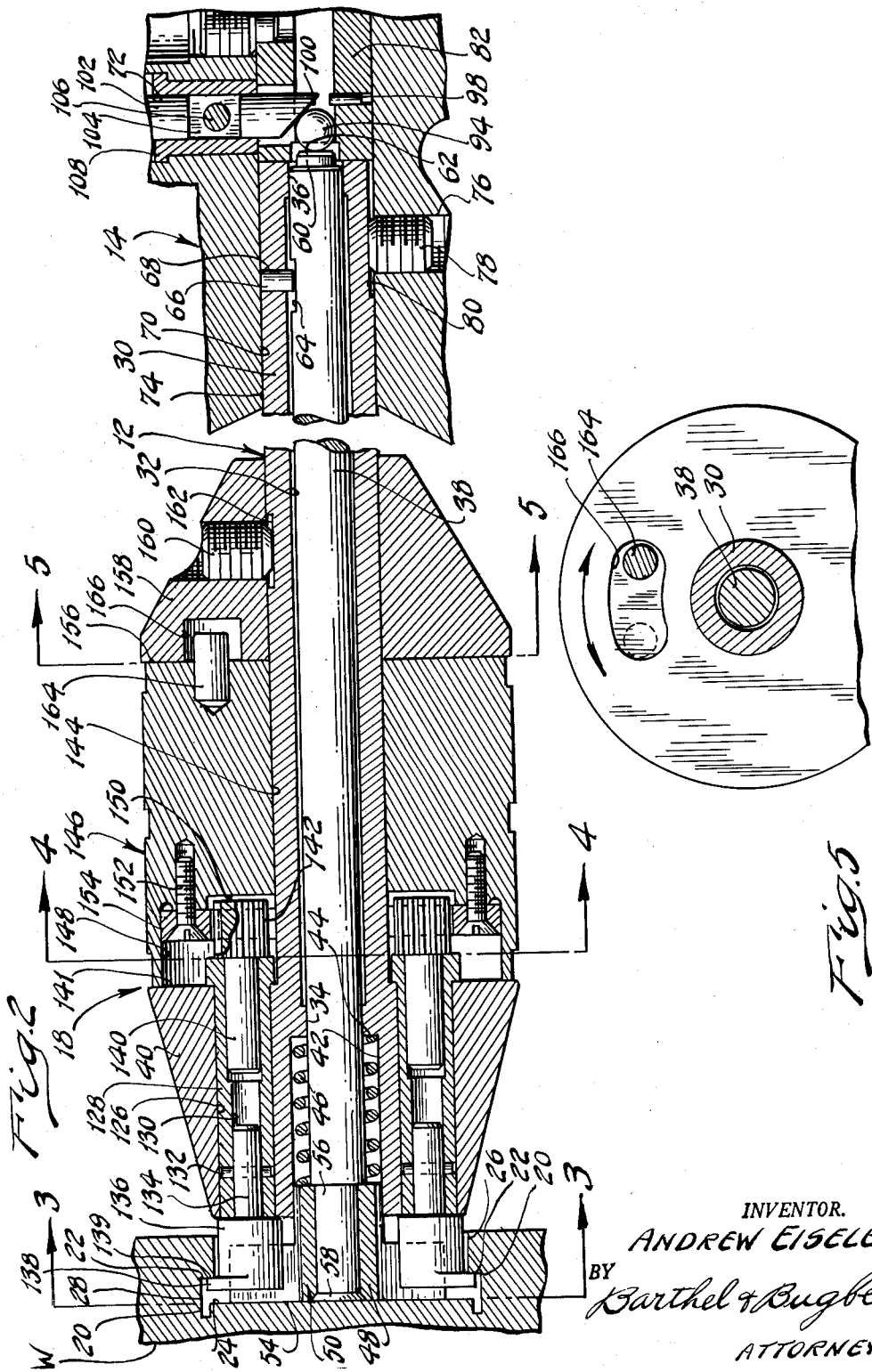

United States Patent Office 3,086,292
Patented Apr. 23, 1963

3,086,292
SURFACE-SEPARATION MEASURING GAUGE
Andrew Eisele, 459 Beldon Road, Garden City, Mich.
Filed June 10, 1960, Ser. No. 35,215
8 Claims. (Cl. 33—147)

This invention relates to precision gauges and, in particular, to gauges for the measurement of the distances separating two surfaces, hereinafter referred to as "surface-separation measuring" gauges.

One object of this invention is to provide a precision surface-separation measuring gauge by the use of which the distance separating two given surfaces in a workpiece or other article may be measured with high accuracy and the separation shown upon a suitable indicator, such as a conventional dial indicator.

Another object is to provide a precision surface-separation measuring gauge of the foregoing character which is adapted to measure the separation of two surfaces located within a recess with a restricted entrance, the gauge being provided with means for extending and retracting stationary measuring elements insertable through the entrance so as to engage one of the surfaces, a movable measuring element engaging the other surface and showing the surface separation on the dial indicator.

Another object is to provide a precision surface-separation measuring gauge of the foregoing character which is especially well adapted for measuring the separation of the surface at the bottom of the recess from the surface or shoulder at the top of the recess, or for measuring the separation of the opposite sides of an internal groove within a bore.

Another object is to provide a precision surface-separation measuring gauge of the foregoing character wherein multiple offset stationary measuring elements are rotatably mounted in a head in circumferentially-spaced relationship and rotated, preferably simultaneously, by mechanism under the control of the operator for selectively extending or retracting the offset portions of the stationary measuring element.

Other objects and advantages of the invention will become more apparent during the course of the following description of the accompanying drawings, wherein:

FIGURE 1 is a side elevation of the precision surface-separation measuring gauge, according to one form of the invention, with the stationary handle portion of the gauge broken away in central vertical section to show details of the motion-transmitting mechanism, and with the stationary measuring elements retracted;

FIGURE 2 is an enlarged central longitudinal section through the gauge of FIGURE 1, with the mid-portion and much of the rearward portion omitted to conserve space, with the stationary measuring elements extended inside a recess in an undercut workpiece;

FIGURE 3 is a cross-section through the workpiece and its recess, taken along the line 3—3 in FIGURE 2 and showing the gauge in end elevation;

FIGURE 4 is a cross-section taken along the line 4—4 in FIGURE 2, showing the mechanism for simultaneously rotating the stationary measuring elements from their retracted positions, shown in dotted lines in FIGURE 3, to their extended positions, shown in solid lines in FIGURE 3; and FIGURE 5 is a cross-section taken along the line 5—5 in FIGURE 2, showing the rotation-limiting mechanism for the rotary handle.

Referring to the drawings in detail, FIGURES 1 and 2 show a precision surface-separation measuring gauge, generally designated 10, according to one form of the invention, as consisting generally of an elongated hollow motion-transmitting support 12 upon the rearward end of which is mounted a stationary handle 14 carrying a dial indicator 16 and on the forward end of which is mounted a measuring head, generally designated 18. Also shown diagrammatically in FIGURE 2 is a portion of a workpiece W containing a circular recess 20 with forward and rearward surfaces 22 and 24, the separations of which are to be measured, and an entrance opening 26 of smaller diameter than the diameter of the side walls 28 of the recess 20. It is preferred that the surface 24 forming the bottom of the recess 20 and annular shoulder surface 22 forming the undercut top surface thereof are flat.

The elongated hollow motion-transmitting support 12 includes a hollow shaft 30 containing a bore 32 which for the major part of its length is relieved but near the opposite ends is provided with smaller diameter cylindrical bearing surfaces 34 and 36 (FIGURE 2) in which an elongated longitudinal motion-transmitting rod 38 of circular cross-section is reciprocably mounted. The forward end of the tubular shaft 30 is provided with an enlargement 40 in the form of a frusto-conical head having a radial annular shoulder 41 therebetween. The enlargement 40 is provided with a central counterbore 42 located forwardly of the bearing bore 34 with an annular shoulder 44 therebetween forming the rearward abutment for a compression spring 46 (FIGURE 2), the forward end of which engages the hollow hub 48 of a cross-shaped movable measuring element 50 (FIGURE 3) with arms 52 extending radially therefrom and with an accurately-flat front surface 54 engageable with the surface 24, the separation of which is to be measured from the annular internal shoulder 22. The hub portion 48 is bored centrally to receive the reduced diameter forward end portion 56 of the motion-transmitting rod 38. The forward end of the reduced diameter portion is upset to provide an enlargement 58, like the head of a rivet, for holding the movable measuring element 50. The rearward end of the motion-transmitting rod 38 has a reduced diameter portion 60 with an accurately-machined flat contact surface 62. The motion-transmitting rod 38 near its rearward end portion 60 is provided with a longitudinally-elongated flat spot 64 engaged by a pin or set screw 66 seated in a radial hole 68 in the hollow shaft 30 for preventing rotation of the motion-transmitting rod 38.

The stationary handle 14 is of a shape conveniently grasped in the palm of the hand and is provided with a longitudinal bore 70 and a transverse stepped bore 72 drilled with their axes at right angles to one another and communicating with one another. The bore 70 is of such diameter as to snugly but slidably engage the outer surface 74 of the hollow shaft 30 and the stationary handle 14 is drilled and threaded radially as at 76 to receive a headless set screw 78 engaging a longitudinally-elongated flat spot 80 adjacent the outer surface 74 of the hollow shaft 30 (FIGURE 2).

Snugly inserted in the rearward end of the handle bore 70 is a sleeve or bushing 82 which is drilled radially as at 84 and 86. The stationary handle 14 is drilled and threaded radially as at 88 to receive a headless set screw 90, the nose of which enters the hole 86 to lock the bushing 82 in position. Rollably mounted in the longitudinal bore 92 of the bushing 82 is a motion-transmitting ball 94 of precision sphericity and of hardened material such as hardened steel. The bushing 82 intermediate its ends is drilled radially to receive a ball-retaining pin 98 (FIGURE 2) which limits the rearward reciprocation of the ball 94.

The ball 94 is interposed between the rearward end surface 62 of the motion-transmitting rod 38 and the 45° inclined surface 100 on the inner end of a transverse motion-transmitting rod 102, one side of which is flattened as at 104 for engagement by a rotation-preventing set screw 106. The transverse motion-transmitting rod 102 is snugly but slidably mounted in a flanged bearing bushing 108 which in turn is snugly mounted in the stepped bore 72. The lower end of the stepped bore 72 is aligned with the enlarged hole 84 to provide adequate clearance. The upper end 110 of the transverse motion-transmitting rod 102 is machined accurately flat for engagement by the rounded head 112 of the dial indicator plunger 114 reciprocably mounted within the barrel or stem 116 thereof. The stem 116 is snugly inserted in the upper end of the stepped bore 72 and clamped therein by the clamping screw 118, the upper end of the handle 14 being split for clamping action. The dial indicator 16 has the usual needle 120 mounted on a shaft 122 connected by conventional motion-converting mechanism to the plunger 114 and registering upon the usual arcuate scale 124. The latter is graduated in dimensions of any desired system of measurement, such as thousandths of an inch.

The measuring head 18 includes the hollow shaft enlargement 40, which is bored parallel to the axes of the bores 32, 34, 36 with outlying circumferentially-spaced bores 126 (FIGURES 2 and 3). Snugly but rotatably mounted in the bores 126 are flanged tubular stub shafts 128 containing stepped bores 130 and drilled radially near their forward ends to receive pins 132 which pass through the shanks 134 of headed rotary stationary stop pins 136 having offset stop portions 138 projecting laterally therefrom and adapted, when extended, to engage the annular surface or shoulder 22 at their accurately-machined flat rearward stop surfaces 139. Inserted with a driven fit in the rearward end of each stepped bore 130 is the shank or hub 140 of a pinion 142 in such a manner that the pinion 142, tubular shaft 128 and headed pin 136 rotate as a unit.

Rotatably mounted upon the hollow shaft 30 and having a bearing bore 144 rotatably engaging the outer surface 74 thereof is a knurled rotary handle 146 in the form of a knurled collar. The forward end of the rotary handle 146 (FIGURE 2) is provided with an annular recess 148 from which four radial approximately cylindrical recesses 150 extend inward toward the bore 144 and receive the four pinions 142. The rotary handle 146 within the recess 148 is drilled and threaded axially at circumferentially-spaced locations to receive screws 152 by which an internal ring gear 154 is fixedly mounted in the recess 148 in mesh simultaneously with the four pinions 142. The forward end of the collar or rotary handle 146 engages the annular radial surface 41 on the rearward end of the hollow shaft enlargement 40 (FIGURE 2), whereas its rearward end engages the forward surface 156 of a stop collar 158, also of frusto-conical shape. The stop collar 158 is drilled radially to receive a headless set screw 160, the inner end of which engages an elongated flat spot 162 on the hollow shaft 30 to prevent relative rotation and hold the stop collar 158 stationary. The rearward end of the rotary handle 146 is drilled parallel to the axis to receive a stop pin 164 (FIGURES 2 and 5) which is movable to and fro as a unit with the rotary collar 146 and limits the rotation of the latter by engagement with the opposite ends of an arcuate recess 166 formed in the forward end of the stop collar 158 and extending inwardly from the forward surface 156 thereof.

In the operation of the surface-separation measuring gauge 10, to measure the separation of the annular shoulder surface 138 from the opposite or bottom surface 24 of the recess 20 in the workpiece W, let it be assumed that the stationary stop pins 136 are in their retracted positions shown in solid lines at the left-hand end of FIGURE 1 and in dotted lines in FIGURE 3, with their offset stop portions 138 facing inward toward the motion-transmitting shaft end 58. The operator then grasps the stationary handle 14 in one hand, the rotary handle 146 of the measuring head 18 in the other hand and inserts the forward end of the instrument through the workpiece opening 26 into the recess 20 therein. While holding the stationary handle 14 immovable with one hand, he rotates the rotary handle 146 with the other hand in a right-hand or clockwise direction, thereby rotating the ring gear 154 and the pinions 142 meshing therewith. This action rotates the tubular shaft 128 and the headed rotary stationary stop pins 136 from their retracted positions of FIGURE 1 to their laterally-extended positions of FIGURE 2 with their offset stop portions 138 extending into the recess 20 behind the forward annular surface 138 thereof. The term "stationary" is applied to the rotary stop pins 136 because these remain stationary during the actual measuring operation, although rotated to extend and retract their offset stop portions 138.

Meanwhile, as the operator pushes the forward end of the measuring head 18 of the gauge 10 into the workpiece recess 20 in the manner described above, the forward surface 54 of the cross-shaped movable measuring element 50 engages the bottom or rearward surface 24 of the recess 20, halting as the forward end of the measuring head 18 continues to be pushed forward into the recess 28. The relative motion thus set up between the halted longitudinal motion-transmitting rod 38 and the forwardly-moving tubular shaft 30 and the handle 14 attached thereto causes the inclined surface 100 of the transverse motion-transmitting rod 102 to push the motion-converting ball 94 against the now stationary end surface 62 of the rod 38, causing the transverse motion-transmitting rod 102 and the dial indicator plunger 114 to be shifted outward. This motion is converted into rotary motion of the dial indicator shaft 122 by the motion-converting mechanism therein (not shown), thereby causing the end of the needle 120 to sweep over the graduated scale 124. The operator then pulls backward carefully upon the measuring head 18 of the instrument 10 until he feels the stop surfaces 139 on the offset stop portions 138 engage the annular forward undercut recess surface 22, whereupon he observes the scale reading of the pointer 120 of the dial indicator 16 upon its scale 124. This reading, when the instrument has been calibrated with a master setting gauge, accurately indicates the axial distance between the top and bottom surfaces 22 and 24 of the recess 20 or the axial width of a groove so formed by the surfaces 22, 24 and 28. In this manner, the dimensions of grooves to recieve snap rings or other articles may be quickly and accurately measured.

When the operator has taken the measurement, he continues to hold the handle 14 stationary in one hand while he rotates the rotary forward handle 146 in a left-hand or counterclockwise direction as he faces the workpiece W, thereby rotating the ring gear 154, pinions 142 and rotary stationary stop pins 136 to retract the offset stop portions 138 thereof from their extended (solid line) positions of FIGURES 2 and 3 to their retracted (solid line) positions of FIGURE 1, also shown in dotted lines in FIGURE 3. The operator can then safely withdraw the forward end of the measuring head 18 from the recess 20 through the restricted entrance opening 26 thereof without damage to any of the parts. At the same time, the portions of the headed pins 136 opposite the offset stop portions 38 thereof serve as guide surfaces to engage the wall of the entrance open 126 if the measuring head 18 is inadvertently moved sidewise, preventing the movable measuring element 50 from colliding with any part of the workpiece and therefore preventing damage to the instrument.

What I claim is:

1. A precision surface-separation measuring gauge for measuring the axial distance between two axially spaced internal surfaces disposed within an opening having an entrance of restricted size, said gauge comprising an elongated hollow supporting structure having forward and rearward portions, a dial indicator mounted on said rearward portion, a stop device including a plurality of circumferentially-spaced stop elements movably mounted on said forward portion for lateral motion from a retracted position of reduced overall diameter insertable through said entrance to an extended position of enlarged overall diameter fixedly engageable with one of said surfaces, means for so moving said stop elements, a feeler element movably mounted in said forward portion for longitudinal motion away from said stop device into engagement with the other surface, and motion-transmitting mechanism in said supporting structure operatively connecting said feeler element to said dial indicator and responsive to the motion of said feeler element relatively to said stop device for corespondingly actuating the dial indicator to indicate the separation of said surfaces.

2. A precision surface-separation measuring gauge, according to claim 1, wherein said stop elements are rotatably mounted in said forward portion.

3. A precision surface-separation measuring gauge, according to claim 2, wherein each of said stop elements includes a rotary support and an offset stop portion which is offset laterally from said support.

4. A precision surface-separation measuring gauge, according to claim 2, wherein said stop element moving means includes mechanism for rotating said stop elements.

5. A precision surface-separation measuring gauge, according to claim 4, wherein each of said stop elements includes a rotary support and an offset stop portion which is offset laterally from said support.

6. A precision surface-separation measuring gauge, according to claim 4, wherein said stop element moving means includes a pinion operatively connected to each of said stop elements and also includes a gear meshing with each pinion.

7. A precision surface-separation measuring gauge, according to claim 6, wherein said stop element moving means also includes a rotary handle rotatably mounted on said supporting structure and operatively connected to said gear.

8. A precision surface-separation measuring gauge, according to claim 1, wherein said feeler element includes a plurality of circumferentially-spaced surface contacting portions extending laterally therefrom and wherein said stop elements are disposed in the spaces between said surface-contacting portions.

References Cited in the file of this patent

UNITED STATES PATENTS

| | | |
|---|---|---|
| 2,643,459 | Beers et al. | June 30, 1953 |
| 2,828,546 | Campbell | Apr. 1, 1958 |
| 2,830,375 | Zwayer | Apr. 15, 1958 |